June 27, 1961 W. J. WAHL ET AL 2,990,309
METHOD OF MAKING AN ELONGATED FLANGED SLIT TUBULAR ARTICLE
Filed Dec. 10, 1956
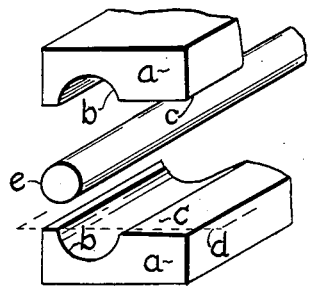
FIG. 1
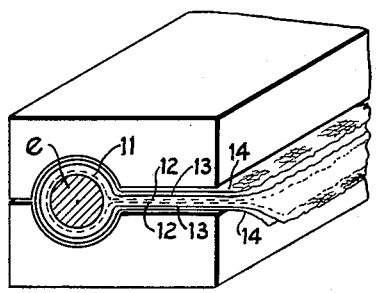
FIG. 2
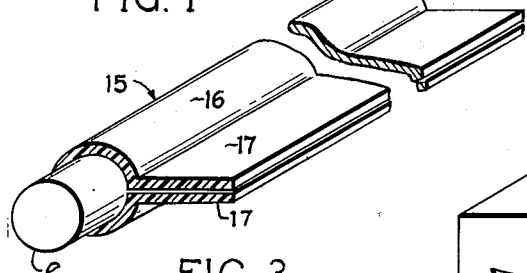
FIG. 3
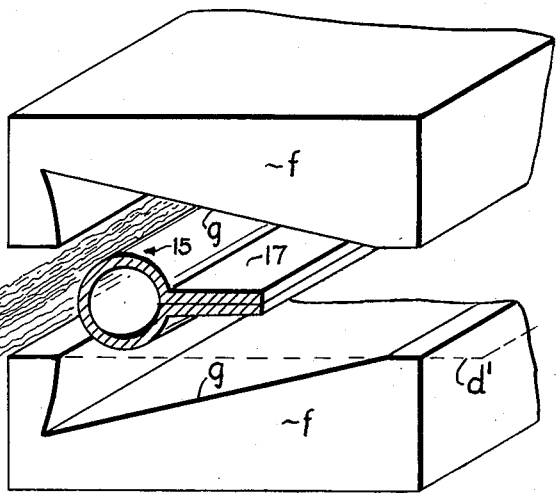
FIG. 5
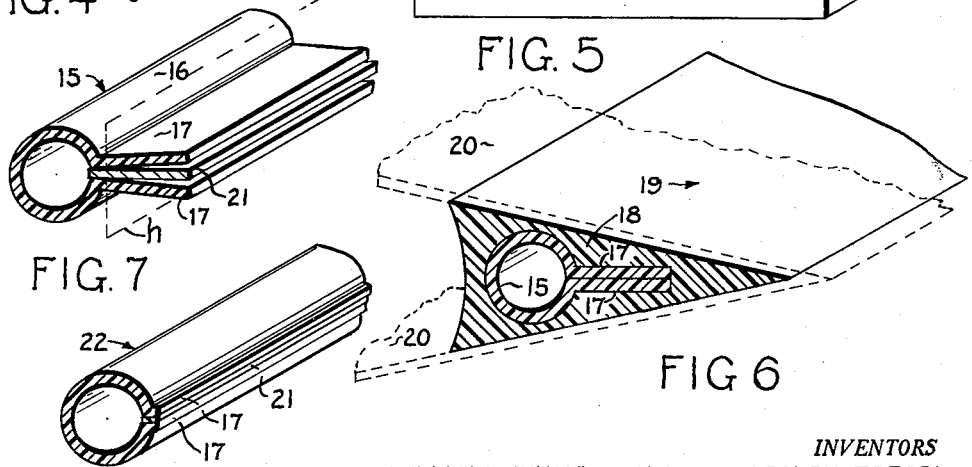
FIG. 4
FIG. 7
FIG. 6
FIG. 8
INVENTORS
WILLIAM JUNIOR WAHL AND ADOLPH TOEGEL
BY
Jerome A. Grow,
ATTORNEY United States Patent Office 2,990,309
Patented June 27, 1961

2,990,309
METHOD OF MAKING AN ELONGATED FLANGED SLIT TUBULAR ARTICLE
William Junior Wahl, Grawn, and Adolph Toegel, Traverse City, Mich., assignors to Parsons Corporation, Detroit, Mich., a corporation of Michigan
Filed Dec. 10, 1956, Ser. No. 627,374
5 Claims. (Cl. 154—83)

This invention relates to tubular structural shapes made of reinforced plastics, and particularly to the making of glass and resin plastic tubes and hollow shapes of length sufficient for spanwise use in elongated airfoils such as helicopter rotor blades.

Although extruded plastic tubes have been made of lengths adequate for nearly any purpose, it has not heretofore been possible to make an elongated narrow, constant-section tube by a process of lamination, principally because no practical method existed for removing mandrels from such tubes.

The purpose of the present invention includes:

Providing a laminated plastic reinforcement for molded tubes, and, as articles of subsequent manufacture, hollow structural shapes including such laminated reinforcements; providing elongated plastic laminated tubes of constant section; and providing new processes whereby to form flanged slit tubes, closed reinforced plastic tubes, and closed structural shapes, such as trailing edge reinforcements.

These purposes are achieved in the present invention by a new process which, in general, consists of enfolding a mandrel lengthwise at the middle of a plurality of strips of plastic-coated fiberglass or other laminae, there being a parting strip such as cellophane in contact with the mandrel, and placing the margins of the strips adjacent to each other at one side of the mandrel; molding within a mold to form a tube-like article having adjacent flanges separated by the parting sheet; then removing from the mold; and then prying the flanges apart elastically and removing the mandrel.

In the accompanying drawings:

FIGURE 1 is an exploded perspective view, fragmentary and somewhat schematic, showing the mold and mandrel for manufacturing a flanged, laminated plastic, slit tube incorporating the present invention;

FIGURE 2 is a similar view of the mold of FIGURE 1 assembled and with the materials laid up therein, the mandrel being shown in section;

FIGURE 3 is a fragmentary perspective view of a long, flanged slit tube made in the manner shown in FIGURE 2, before removal of the mandrel;

FIGURE 4 is a fragmentary perspective sketch illustrating such slit tube sprung open to remove the mandrel;

FIGURE 5 is an exploded perspective view, fragmentary and somewhat schematic, illustrating a subsequent stage of manufacture in which the article of FIGURE 3 is used to manufacture a molded structural shape to serve as an airfoil trailing edge reinforcement;

FIGURE 6 is the trailing edge reinforcement manufactured in the manner shown in FIGURE 5;

FIGURE 7 is a schematic perspective illustrating how the flanged slit tube of FIGURE 3 is made into a closed tube; and FIGURE 8 is a fragmentary perspective view of the closed tube so made.

Since the parts shown are elongated and of constant section, the ends of the molded parts are cross-hatched for greater clarity. For like reasons, only the forward end fragments are illustrated, except in case of FIGURE 3.

In FIGURE 1 are shown upper and lower tube mold halves $a$, used for the first molding operation. Because of their simple shape and constant cross-section, they are made to whatever length may be desired, say twenty feet. The upper and lower molds $a$ each include a substantially semi-cylindrical cavity $b$ and a flange-forming face $c$ adjacent thereto. The flange-forming faces $c$ are flat and offset from the mold parting plane $d$, sufficiently to form flanges, as shown in FIGURE 2.

The radii of the semi-cylindrical cavities $b$ in each mold half $a$ are sufficient to accommodate the thickness of the material when folded over a continuous wire or tube mandrel $e$, which for the most purposes will be of circular cross-section, and which serves as the core for molding. The diameter of the wire $e$ fixes the inner diameter of the molded tube, which may conveniently be, say, ⅛".

The wire $e$ is enfolded within the material to be laminated in the manner shown in FIGURE 2. All the material is in narrow strip form, wide enough to fold over the wire $e$ and provide the flanges hereafter described, that is, wider than the circumference of the wire $e$. First adjacent the wire is a strip of thin, preferably water-soluble cellophane 11, which serves as a parting sheet, and has its edge margins 12 folded back against each other. Immediately adjacent and in registration with this is a first layer consisting of a strip of fiberglass cloth 13, coated on both sides with the wet plastic resin; and a second fiberglass cloth layer 14, similarly coated, is in registration immediately adjacent. Additional cloth layers may be provided; in the alternative other laminating sheets and adhesives may be used.

For easy handling the layers of resin-wetted fiberglass cloth strips 13 and 14 may first be laid over the lower tube mold $a$ with the cellophane strip 11 on top of them, and the wire $e$ then put in place lengthwise at substantially the middle of the parting sheet. The operator then folds back the laid-up assembly over the wire $e$ so that it nests in the fold and leaves edge margins on each side of the mandrel. The edge margins of the strips of cloth will form parallel adjacent flanges outwardly of the cellophane edge margins 12; whereas the cellophane edge margins 12 so folded against each other and which extend sideward from the wire $e$ to the edge of the mold, to thus provide a parting line extending inward to the wire $e$.

Utilizing a molding technique suitable for the material employed, the assembly is then set in the mold as shown in FIGURE 2, and cured to hard condition; and the edges outstanding from the mold are trimmed. The mold halves $a$ are then opened; and the mandrel wire $e$ is readily removed from between the enfolded parting sheet 11. This yields, as a first article of manufacture, a flanged slit tube generally designated 15, having a substantially cylindrical tubular slit body portion 16, with parallel adjacent flat flanges 17 adjacent the slit as shown. The tubular slit body portion 16 is somewhat resilient or spring-like; thus the flanges 17 are pried apart elastically as shown in FIGURE 4, to permit the wire $e$ to be withdrawn or "snapped" out.

The flanged slit tube 15 has proved to be highly useful, both as a structural skeleton or reinforcement for other molded plastic shapes, such as the trailing edge arrowhead insert as shown in FIGURE 6, and, when sealed in the manner shown in FIGURES 7 and 8, as a high-strength plastic tube.

In utilizing the flanged slit tube 15 as a structural skeleton for a trailing edge molded structural shape, the tube 15 is inserted between upper and lower elongated shape molds designated $f$ in FIGURE 5, each having a semi-arrowhead cavity $g$, the molds being designed to meet along a parting plane designated $d'$. Skeins of fiberglass rovings 18 consisting of elongated fibers saturated with wet plastic resin, are arranged in the mold cavities $g$ around the outer surface of the flanged slit tube 15, in such manner as to fill the mold around the tube 15 with an adequate amount of fluid plastic resin and supplemental reinforcing fibers. This is referred to as the rovings-and-resin fill 18. Structurally it is very much akin to the fiberglass cloth, resin-impregnated laminates 13, 14. On molding and curing in the shape molds *f*, a new product is achieved, namely, the hollow reinforced plastic trailing edge structural shape generally designated 19 and shown in FIGURE 6, adapted to be secured adhesively to and along the rear margins of upper and lower blade skins 20.

While the lengthwise rovings of the fill 18 give added strength to the structural shape 19, in some cases they may be dispensed with. Particularly is this true where the shape given to the flanged slit tube 15 comes close at most points to the external contour of the final structural shape 19; for the slit tube 15, when encased by hardened plastic resin, will serve as the structure of such a shape and the added resin will bond securely to it.

Ordinarily it will be desirable to remove the water-soluble cellophane sheet 11 from between the flanges 17 before it is incorporated in the mold as shown in FIGURE 5. Then a certain amount of the resin of the fill 18 tends to penetrate into the very narrow space between the flanges 17 from which the cellophane sheet has been removed. However, the solid exterior fill 18 which encases the slit tube 15 is sufficient to hold the flanges together.

The tube body portion 16 provides a cylindrical hollow through the entire trailing edge shape 19, whose interior surface is abrasion-resistant fiberglass cloth. This hollow serves various purposes, including weight reduction and enclosing wires, etc. The reinforcement by the flanges 17 of the narrower aft portion of the arrowhead makes the flanged tube 15 a true skeletal structure.

In order to form the slit flanged tube 15 into a closed plastic tube, after the water-soluble parting sheet 13 is removed from between the flanges 17, the flanges are held pried apart and a suitable adhesive inserted between them. Such adhesive may preferably be in tape form, as for example, nitrile rubber phenolic tape adhesive 21 shown in FIGURE 7. The tape adhesive 21 is inserted so that its inner edge will in effect continue the cylindrical inner wall of and close the cavity within the tube body portion 16. Inasmuch as nitrile rubber phenolic adhesive is cured under heat and pressure, pressure for setting and curing the bond is applied to the flanges 17, and heat of suitable intensity furnished for the requisite period of time. The flanges 17 are then trimmed close to the tube body 16, along a trimming plane *h* as shown in FIGURE 7. The product resulting from this operation is a long, closed trimmed tube 22, shown in FIGURE 8, substantially cylindrical both inside and out, possessing strength far beyond that of extruded plastic tubes. Adjacent its adhesive side seam 21, its structural laminae turn outward from the tube body 16 (as shown in FIGURE 2) and these laminae are continuous from one flange 17, to and around the tube body 16, and to the outer edge of the other flange 17.

If desired, a larger portion of the flanges 17 may be left on the trimmed tube 22, sufficient for attachment to other articles or to lend further structural strength. Further, the tube 22 need not be made to the form of a hollow cylinder; for example, the tube might be triangular, in which case a triangular wire mandrel would be used in a suitable cavity. Likewise, there need be no complete correlation between the shape of the mandrel *e* and the cavity *b*, because the molding of resin-wetted fiberglass cloths permits a substantial variation from the inner to the outer contour. Also, the flanges 17 need not be flat; for example, they might have narrow adjacent portions with diverging portions extending outwardly therefrom.

This invention is not to be deemed limited to any particular material. It has been found particularly well adapted for use in the molding of fiberglass cloth with polyester resins, although other plastics, such as the phenolics, epoxies and melamines, may well be used in certain applications. Furthermore, any material suited for laminating or laying up with such plastics may be substituted for the fiberglass cloth, subject to the probable lessening of structural strength which would attend such substitution of materials.

The water soluble parting strip 11 was chosen because this material is impervious to fluid plastic resin, and is readily removed. However, other impervious sheet material might be substituted, and could become a permanent part of the molded assembly. Care must be taken that its top surface into which the mandrel *e* is folded be kept free from plastic resin, so as to maintain a parting line from the outer edge of the part between the flanges and to the mandrel.

Other modifications and uses will occur to those skilled in the art. Accordingly the present invention should not be construed narrowly, but as fully coextensive with the claims which follow.

We claim:

1. The process of molding an elongated flanged slit tubular article, comprising the steps of folding back over an elongated mandrel, an elongated parting sheet and an elongated plastic-wetted lamina strip outwardly thereadjacent, placing the marginal portions of the parting sheet margins adjacent to each other to extend outward from the mandrel to the outer edge of the article to be molded between the marginal portions of the plastic-wetted lamina strip and thus form a plastic-free parting line, molding and curing the lamina strip, prying its marginal portions apart elastically along the parting line and removing the mandrel.

2. The process of claim 1, together with the additional steps of inserting adhesive between the marginal portions of the cured lamina strip and curing the adhesive.

3. The process of claim 1, together with the additional steps of inserting adhesive material in strip form between the pried-apart marginal portions of the cured lamina strip, pressing the marginal portions together and curing the adhesive under pressure.

4. The process of claim 2, together with the further step of trimming the marginal portions adhered by the cured adhesive.

5. The process of making a flanged slit tube, comprising the steps of wetting strips of foldable laminae with fluid plastic, laying the strips up together and covering same with a parting sheet, folding the lay-up of strips and parting sheet back over an elongated mandrel so as to nest the mandrel lengthwise at the middle of the parting sheet and to leave margins of the parting sheet adjacent to each other, thereby providing a parting line extending to the mandrel, molding the lay-up within a mold and curing, removing the molded and cured lay-up from the mold, prying said lay-up open along the parting line and removing the mandrel.

References Cited in the file of this patent

UNITED STATES PATENTS

| | | |
|---|---|---|
| 169,760 | Baker | Nov. 9, 1875 |
| 1,485,994 | Salisbury | Mar. 4, 1924 |
| 1,958,131 | Davidson | May 8, 1934 |
| 2,204,622 | Reid | June 18, 1940 |
| 2,594,838 | Alexander et al. | Apr. 29, 1952 |
| 2,609,319 | Boge | Sept. 2, 1952 |
| 2,671,041 | Dodge | Mar. 2, 1954 |
| 2,686,747 | Wurtz et al. | Aug. 17, 1954 |
| 2,790,464 | Stephens et al. | Apr. 30, 1957 |

FOREIGN PATENTS

| | | |
|---|---|---|
| 493,598 | Italy | Apr. 27, 1954 |